United States Patent [19]

Long et al.

[11] Patent Number: 5,150,311
[45] Date of Patent: Sep. 22, 1992

[54] ELECTRONIC PRINT-DOT GENERATION

[75] Inventors: Robert J. Long, Blewbury; Barry D. R. Miles, Newbury, both of England

[73] Assignee: Quantel Limited, Newbury, England

[21] Appl. No.: 735,093

[22] Filed: Jul. 22, 1991

Related U.S. Application Data

[63] Continuation of Ser. No. 350,605, May 11, 1989, abandoned.

[30] Foreign Application Priority Data

May 17, 1988 [GB] United Kingdom ............... 8811648

[51] Int. Cl.⁵ ............................................ G06K 15/00
[52] U.S. Cl. .................................. 395/108; 364/930; 364/DIG. 2
[58] Field of Search ................. 364/518–520, 364/235 MS, 930 MS, 964, 964.5, 964.6; 346/154, 157; 358/296, 298, 462; 400/65, 61

[56] References Cited

U.S. PATENT DOCUMENTS 4,682,190  7/1987  Ikeda et al. ................... 346/154

Primary Examiner—Arthur G. Evans
Attorney, Agent, or Firm—Cooper & Dunham

[57] ABSTRACT

A system for producing output print-dot data suitable for hard copy printing devices (10). A first framestore (11) stores first intensity-related pixel data at a first resolution, which is converted to first higher resolution print-dot data by a print-dot generator (17,18). A control store (19) stores one-bit control data at the said higher resolution and the output print data is selected from the first print-dot data or from a second source of print dot data in response to the control data. Both sources of print-dot data may be derived from intensity related pixel data generated on an electronic graphic system such as a PAINTBOX (Registered Trade Mark). The high resolution data may also be generated by the system and displayed electronically with full color graphics.

26 Claims, 2 Drawing Sheets

ELECTRONIC PRINT-DOT GENERATION

This is a continuation of application Ser. No. 350,605, filed May 11, 1989 abandoned.

BACKGROUND TO THE INVENTION

The present invention relates to generating print-dot data for high resolution printing devices.

Image data may consist of a plurality of multi-bit words, in which each word identifies the brightness of a respective picture element (pixel) of the image. In a full color system, each word may consist of twenty four bits, with eight bits allocated to each of the three primary colors of red, green and blue (RGB). When an image is being displayed, the associated words are loaded into a memory device (referred to as a framestore) which is then continually read in raster order (at 25 or 30 frames per second) to produce a video signal.

Systems are known for converting intensity related pixel data into a form suitable for printing permanent hard copies, in which light absorbent ink is transferred to a suitable image carrying medium, such as chemically treated paper. Unlike phosphor stimulated by electrons, each ink has only one level of light absorbency, therefore, different techniques must be employed to create a full gamut of colors.

A technique, for producing "half tones" in a printing process, is disclosed by Peter Stucki in his book "Advances in Digital Image Processing; theory, application and implementation", published as part of the IBM research symposia series. In particular, a process of "digital screening" is described, from page 205, in which the total image area is divided into a regular pattern of unit areas, each unit area is divided into a pattern of print-dot positions and the darkness of each unit area is determined by the number of print-dot positions which have a dot of ink applied thereto. This approach may be used to convert intensity related pixel data to print-dot data, in which each pixel of the intensity related image becomes an identifiable unit area of the printed image, onto which a plurality of print dots (sometimes referred to as imprints or pels) may be applied.

The print dots could be distributed evenly over each unit area but, particularly with very small dots, the relationship between the amount of ink applied and the area covered is very non-linear. The solution, identified in Mr. Stucki's book, is to cluster a predetermined number of print dots together, so that the image consists of an array of evenly spaced larger dots of variable size, as shown in FIG. 23 and 27 of the chapter "Image Processing for Document Reproduction". However, a disadvantage of this approach is that it reduces the perceived spatial resolution for a given print-dot resolution, therefore, a higher print-dot resolution is required for a given perceived resolution. In practice, when converting from intensity related pixel data to spatially related print-dot data, the resolution of dot clusters should be of similar order to the spatial resolution of the pixels and the number of print-dots in each cluster should be of similar order to the number of intensity levels representing each pixel. Thus, for magazine quality prints, the screening resolution is typically above 130 clusters per inch and the resolution of the print-dots is twelve times that of the dot clusters in both the x and y dimensions.

In a typical full colour printing process, black ink and inks for the subtractive colors of cyan, yellow and magenta are used. A photographic separation is created for each colour, consisting of mutually offset patterns of dot clusters and the shape and position of each cluster is determined by the position of high resolution print-dots. In a system receiving input image data in the form of intensity related pixels, a print-dot generator is provided to calculate the position of each high resolution print-dot for each colour separation.

Dot clusters in the output data and pixels of the input data may have a one-to-one relationship, i.e. the spatial resolution of the dot clusters (formed from a plurality of high resolution print-dots) may be exactly equal to the spatial resolution of the intensity related pixels. Alternatively, each cluster may receive a contribution from many pixels or enlarged images may be produced by generating a plurality of clusters for each pixel.

An electronic graphics system is disclosed in U.S. Pat. No. 4 514 818 (equivalent to British Pat. No. 2 089 625B) assigned to the present Assignee (Applicant) for generating intensity related pixel data and a system embodying the principles disclosed in this patent (and arranged to generate data at a resolution suitable for printing high quality images) is manufactured by the present Assignee (Applicant) and sold under the trade mark "GRAPHIC PAINTBOX". The image, stored in a framestore, is viewed on an RGB monitor and movement of a graphic implement, such as a brush, chalk or air-brush, is simulated by moving a stylus over a touch tablet. The stylus is constructed so that, when manipulated, it generates a signal representing the pressure with which it is applied to the touch tablet and the touch tablet produces a signal representing the x and y co-ordinates of successive points on a stroke made by moving the stylus over the touch tablet. A processing unit receives the pressure and position signals,, along with an indication of the selected implement and the selected color, from which it modifies the values stored in the framestore.

Once an image has been generated, it may be stored on a suitable data carrying medium (magnetic tape or disc etc.) or supplied to a printing device via a suitable data converter. The data converter first of all converts the additive RGB signals, read from the framestore, to subtractive cyan, yellow, magenta and black (CYMB) signals which are then supplied to a print dot generator.

As described in Mr. Stucki's book (page 214) the angle between each array of dot clusters, making up a respective separation, is made as large as possible to prevent Moire patterns, thus, typical displacement angles (with respect to a notional east-west line) are cyan 75 degrees, yellow 90 degrees, magenta 15 degrees and black 45 degrees.

In the aforesaid system, manufactured by the present Assignee/Applicant, image data may be generated for printing magazine-quality images 300mm square, having six dot-clusters per mm, each constructed from high resolution print-dots at seventy two per mm. Each cluster receives a contribution from four adjacent pixels of the intensity related image and a resolution of six dot clusters per mm is satisfactory for producing full colour images for, say, photographs and headings. However, a problem with this known system is that it cannot resolve body text, and line drawings etc. where characters may be less than two millimetres square and line thicknesses substantially less than one mm. Thus, the electronic processing capabilities of the graphics device described above can only be used for full colour images and headlines, each printed in lower resolution dot clusters. Body text and fine line drawings (logos etc.) must be composited on a conventional printing machine, producing a transparency of the artwork, and then combined with the colour separations, as part of a photographic process in which the colour images are said to be "dropped in" around the areas of text. In situations where the text is placed over an image, as is common in advertising brochures etc., it may be necessary to form a matte to block out areas of colour in the separations where text will be added.

It is an object of the present invention to provide an improved system for generating print-dot data. In particular, it is an object of the present invention to provide an electronic system for combining high resolution characters (alpha-numeric text, logos and line work, etc.) with full colour graphics and artistic images.

SUMMARY OF THE INVENTION

According to one aspect of the present invention, there is provided a high resolution print dot generating apparatus comprising a pixel source of intensity related pixel data representing an image; converting means for converting said pixel data to first print data defining an array of print dot clusters representing at least one color separation of said image and having a first resolution limited by the spacing of the clusters; a print data source of second print data different to said first print data; a dot source of third print data defining a control image representing at least one character or other uniform block and having a second resolution which is higher than said first resolution and is limited by the spacing of print dots forming said print dot clusters; and selecting means responsive to said third print dot data for selecting either said first print data or said second print data to output print dot data for use in printing such that the output print dot data represents at least one color separation of said image at said first resolution combines with at least one character or other predefined shape at said second resolution.

Thus, characters may be defined by an operator and stored in the form of print dot control data, which is then used to select either first print data, representing an image, or second print data representing say a different image or a color on a print-dot by print-dot basis.

The source of pixel data and the source of print data are, preferably, framestores arranged to store full frames of intensity related signals. The images in each framestore may, therefore, be created using video graphics techniques such as those found on equipment sold by the present assignees under the trademark "GRAPHIC PAINTBOX". The intensity samples may represent red, green and blue components of the pixel and a matrix may be provided for converting these components to cyan, magenta, yellow and black.

The dot source of third print data defining the control image produces a one-bit signal for each print-dot location in the final image. The data may be run-length encoded, wherein a decoder is required to convert the data to one-bit signals. However, in a preferred embodiment the source of control data is a one-bit storage device which has a storage location for each print-dot location in the final image.

In the preferred embodiment there is provided a source of constant "apply-dot" signals, switching means for switching between said source of constant "apply-dot" signals and said output, and a detector for detecting changes in said control data, wherein said switching means is switched to said constant "apply-dot" signal for at least one high resolution print dot position in response to a signal from said detector indicating a change in said control data. Thus, the preferred apparatus may automatically place a border around each character defined by the control data.

Preferably, a pattern of print dots are created for each ink colour, so that each separation defines dot cluster. In the final copy, the print-dots forming each cluster may merge together so that tones are created by clusters of varying size. Preferably, the clusters for each separation are mutually offset.

According to another aspect of the present invention there is provided a method of generating high resolution print dot data, comprising converting intensity related pixel data representing an image to first print data defining an array of print dot clusters representing at least one color separation of said image and having a first resolution limited by the spacing of the clusters; providing second print data different to said first print data; defining a control image as third print data representing at least one character or other uniform block and having a second resolution which is higher than said first resolution and is limited by the spacing of print dots forming said print dot clusters; selecting in response to said third print dot data either said first print data or said second print data for output for use in printing such that the output print dot data represents at least one color separation of said image at said first resolution combined with at least one character or other predefined shape at said second resolution.

According to a further aspect of the present invention there is provided a high resolution print dot generating apparatus comprising:

(a) a first source of print dot signals, representing respectively different color separations of a first set of separations, the print dot signals representing each separation comprising an array of print dot clusters defining the intensity of the respective separation, (b) a second source of print dot signals representing respectively different color separations of a second set of separations, the print dot signals representing each separation comprising an array of print dot clusters defining the intensity of the respective separation, (c) a source of control signals representing a control image comprising an array of print dots defining a selected shape, said shape-defining print dots having the same resolution as the individual print dots of at least one of said first and said second sources of print dot signals, (d) selecting means for selectively outputting the print dot signals from said second source of print dot signals in response to the print dots of said control signal defining said shape, and for selectively outputting the print dot signals from said first source of print dot signals in the absence of print dots in said control signal, whereby the output signals represent a character of a shape defined by said control signals and having a color defined by said second set of separations, set against a background determined by first set of color separations.

DESCRIPTION OF THE PREFERRED EMBODIMENT

Figure 1:
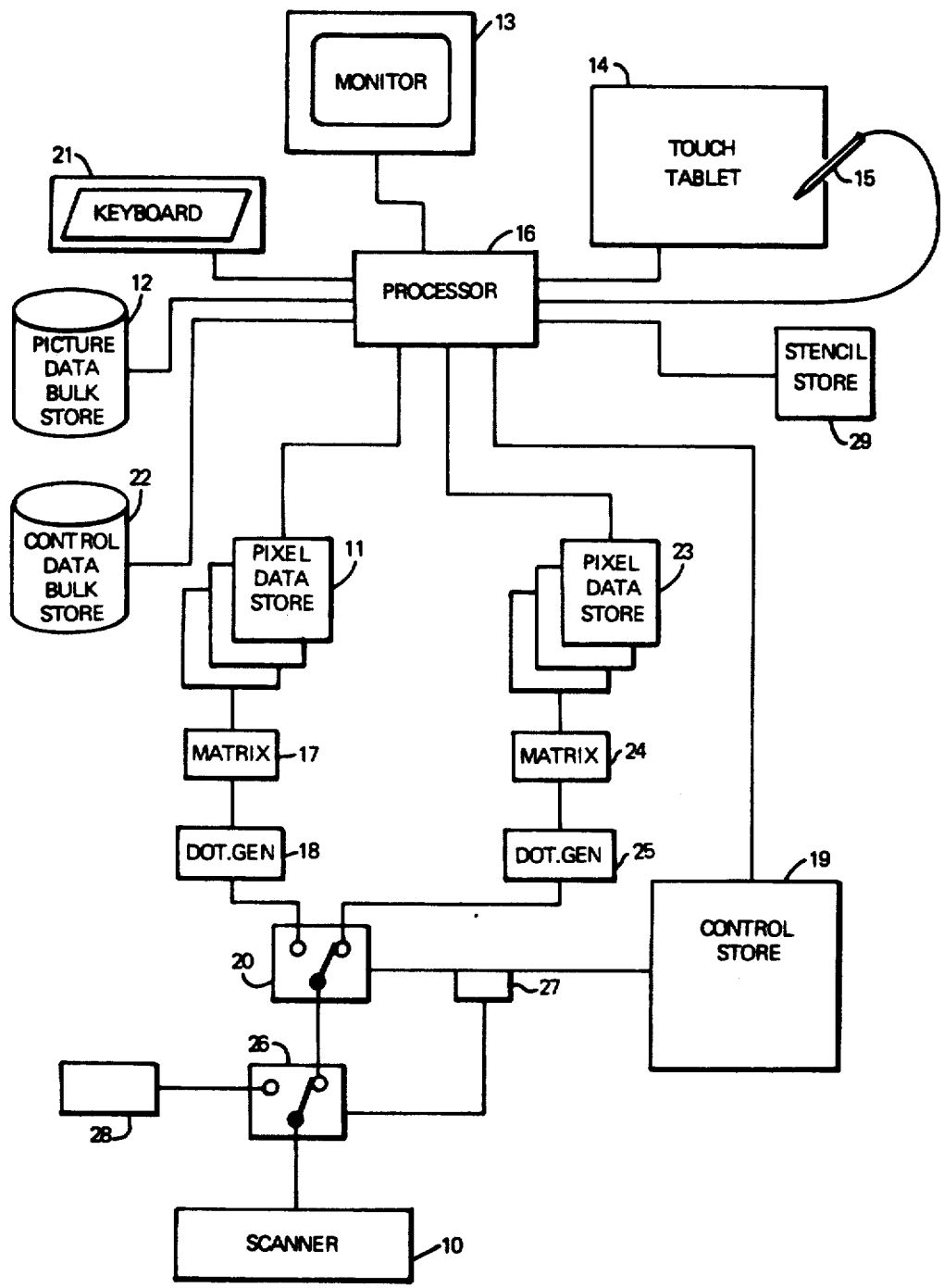
FIG. 1 shows an electronic graphics system including a print-dot generator and a hard copy printing device; and, FIGS. 2A-2F show enlarged portion of an image produced by the printing device shown in FIG. 1.

An electronic publishing system is shown in FIG. 1, having a scanner 10 arranged to produce four hard-copy colour separations (CYMB) with seventy two print dots per millimetre in both the x and y directions. Pixel image data is stored in a first image-data memory device 11 (framestore) wherein the data stored at each location represents the intensity of red, green and blue light at a respective pixel. The intensity related pixel data may be transferred between the memory device 11 and a bulk-storage device 12, such as a magnetic disc drive, optical disc drive or a magnetic tape drive and may also be created or modified using electronic graphics techniques, as described in the Assignees U.S. Pat. No. 4 514 818, included herein as part of the present disclosure. The system is therefore provided with a high resolution RGB monitor 13, a touch tablet 14 and a stylus 15, each operating under the control of a processing unit 16, and a signal is derived from the image data in the framestore 11 to produce a video signal for the monitor 13.

Image data from framestore 11 may be supplied to the scanner 10 via a matrix converter 17 and a dot generator 18. The matrix converter 17 which may be of the kind described in U.S. Pat. No. 4,829,455, converts each intensity related RGB word (typically consisting of eight bits per colour) to subtractive colour components CYMB and the dot generator 18 sequentially generates a pattern of high resolution print-dots, forming variable size dot-clusters, in response to the values of the cyan, yellow, magenta and black inputs. The output from the dot generator 18 consists of data representing a full image of a first colour followed by data representing full images of the second, third and fourth colors; thus, for each full-colour image, the image data in memory device 11 is read four times under control of the processor 16.

For each separation, the matrix converter 17 receives all of the 24 bit RGB words from framestore 11, in which the intensity of each R G and B component is represented by eight bits, giving a total of 256 possible brightness levels for each color. The output from the matrix 17 consists of an eight bit word representing the cyan, yellow, magenta or black component of a twenty four bit input, thus the RGB data from framestore 11 is supplied to the matrix four times, once for each of the four colour separations.

The scanning operation performed by the scanner 10 takes several minutes to complete. In order to provide the user of the system with an indication that the scanning operation is progressing. The processor 16 may be arranged to modify video signals supplied to the monitor 14 so that a band is displayed which moves down the image as data is supplied to the matrix 17 and from these to the scanner 10. Thus, a cyan band may be shown as the data is being read to produce the cyan separation, and similarly yellow, magenta and black bands may be displayed for their respective separations.

The scanner 10 typically consists of a revolving drum onto which a photo-sensitive image-carrying medium is held. Print-dots are formed on the medium by the operation of a laser beam, having a beam diameter substantially equal to that of a high resolution print dot. A plurality of beams, typically twelve, may be applied to the medium simultaneously obtained from a single beam which is split by an array of optical beam splitters and then directed towards the medium via suitable switching devices.

During print-dot formation, the eight-bit output from matrix 17 is supplied to the dot generator 18, which generates print-dot data for one dot cluster in response to four adjacent pixel signals; the cluster being divided into four equal regions. Thus, given that four eight-bit signals (one for each colour separation) are required to make each dot-cluster, the total number of dot-clusters is equal to the total number of pixels; 25% of which are cyan, 25% yellow, 25% magenta and 25% black.

The dot generator 18 includes a look-up-table arranged to produce a pattern of print dots for each eight-bit input, with darker pixels having proportionally more print-dots, and cluster patterns produced by the look-up-table are supplied to a buffer within the generator 18 from which print-dot data is read serially and supplied to the scanner 10. The buffer is required because, although the dot clusters are the same shape for each of the four colors, they are mutually offset as previously described, thus, the processor 16 instructs the dot generator 18 as to the color of ink for which a separation is being produced and the resulting clusters are formed at the required angle. It should be noted that, at this stage, each separation is a black and white image usually consisting (once processed) of black print dots on a clear film. The films are then used to produce printing plates, one for each of the cyan, yellow, magenta and black inks.

The apparatus described so far produces output print-dot data (from dot generator 18) which is suitable for a hard copy printing device such as scanner 10. First intensity-related pixel data is stored in a first storage means (framestore 11) at a first spatial resolution and dot generating means (in the form of matrix 17 and dot generator 18) converts the pixel data (from the framestore 11) to first print-dot data at a second spatial resolution, higher than said first resolution. However, if the high resolution print-dots are only used to define lower resolution dot clusters (produced by dot generator 18) the resolution available to an operator for creative purposes is that of the lower resolution dot-clusters and not that of the high resolution print-dots.

The apparatus shown in FIG. 1 overcomes this problem by providing a control store 19 for storing one-bit control data at said second resolution i.e. at the same high resolution as the print-dots. In operation, the control store 19 is addressed in parallel with the production of print-dot data by the dot generator 18 so that, at any instant, a single datum of print dot data from generator 18 and a datum of control data from the control store 19 are available for the same high resolution print-dot location.

The output from the control store 19 controls a switch 20, which receives switchable inputs from the dot generator 18 and another source of high resolution print-dot data. Thus, the switch 20 provides means for selectively obtaining output print dot data from either the dot generator 18 or from another print-dot generating means in response to the high resolution control data. The operating artist is now provided with access to the full resolution of the printing device by supplying data to the control store 19.

The system shown in FIG. 1 includes a keyboard 21 for generating alpha-numeric text. Text may be generated at low resolution, in which pixel data is supplied to the framestore and subsequently printed from lower resolution dot-clusters, or at high resolution when employing the present invention. For the production of high resolution text, the processor 16 converts each code representing a character to high resolution control data which is supplied to the control store 19, thus, the combination of the keyboard 21, processor 16 and monitor 13 allows text setting programs to run, in which the apparatus effectively becomes an electronic publishing system. However, the combination of full colour graphics with high resolution text on the one machine provides greater creative flexibility than the use of separate machines for these processes. The system also includes a bulk storage device 22, similar to device 12, for storing control data.

Figure 2A:
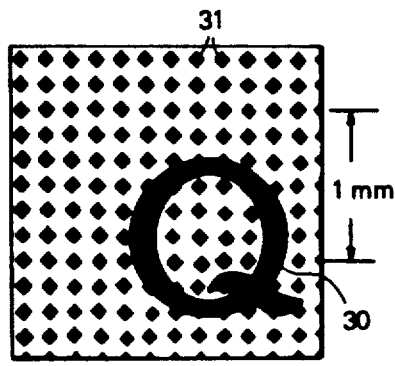

A high resolution letter Q (30) is shown in FIG. 2A against a background of dot-clusters 31 in which the resolution of the dot-clusters 31 is six per mm. The shape and position of the letter is stored in the control store 19 so that, when the respective print-dot locations are scanned, the switch 20 is operated and high resolution print-dot data from the second source are supplied to the output. In FIG. 2A, the second source consisted of a constant high resolution "apply ink" signal and the resulting letter is produced in a solid ink colour. The printing process is such that individual print dots cannot be seen, however, the edge of the letter Q is sharply defined at the higher print-dot resolution.

Figure 2B:
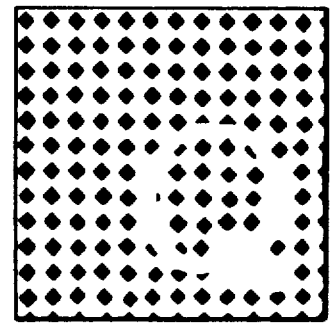

In FIG. 2B, the same first source of image data and control data have been used but the second source of print-dot data consisted of a constant high resolution "apply no ink" signal, therefore the area of the Q has been left blank.

The system shown in FIG. 1 also allows more sophisticated results to be obtained by providing a second framestore 23, similar to store 11, for storing second intensity related pixel data which may also be generated using electronic graphics techniques, or loaded from the bulk storage device 12. During the transfer of data to the scanner 10, both framestores 17 and 24 are read in parallel, the output from store 23 producing high resolution print-dot data by means of a second matrix 24 and a second dot generator 25. Alternatively, signals from stores 11 and 23 may be multiplexed and supplied to a single matrix and dot generator to provide the functions of matrices 17 and 24, and generators, 28 and 25 respectively.

Figure 2C:
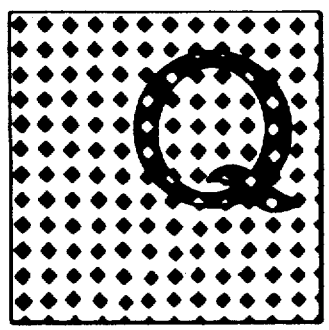

An example is shown in FIG. 2C, in which the first image data and the control data is the same as that for FIGS. 2A and 2B, but the second print dot data is derived from the second pixel store 23. Thus, in this embodiment, the operating artist may define a high resolution character of any colour against any coloured background. Another example is shown in FIG. 2D, in which a coloured character is shown against a white background.

Figure 2D:
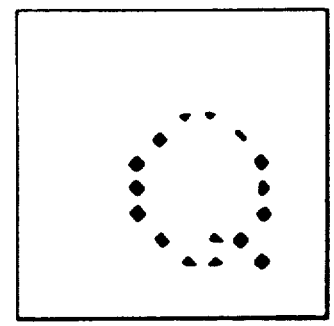
Figure 2E:
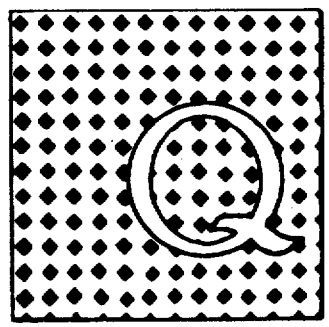
Figure 2F:
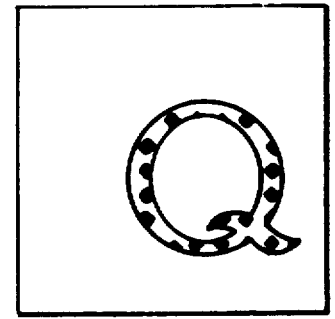

In the examples shown in FIG. 2B and 2D, the shape of the character is not very well defined because at many locations there is no transition at the boundary of the character. The system shown in FIG. 1 is therefore provided with a second switch 26, a detector 27 and a source 28 of constant high resolution "apply-dot" print-dot signals. The detector 27 is sensitive to changes in the control data so that, whenever a change occurs, the switch 26 is placed in its second position for the duration of one, or more, print dots. In its first position, the switch 26 supplies the output from switch 20 directly to the scanner 10, however, when placed in its second position it supplies a constant "apply dot" signal from source 28 to the scanner. The result is that all images defined by the control store have a solid border of one print dot automatically placed around them. Thus, FIG. 2E shows the image of FIG. 2B with a border around the Q and FIG. 2F shows the same process applied to the image of FIG. 2D.

For large images, a control store large enough to store one bit for each print dot location requires quite a large storage device. The control data may, therefore, be run-length encoded, that is to say a value is stored representing the number of consecutive locations set to a first state (no ink) followed by a value representing the number set to the second state (apply ink) and so on in a predetermined spatial direction. The run length data is then processed by the processor 16 to produce one bit control data, alternatively, the control store could be smaller than the whole image and arranged to receive new data from the bulk store 22 during the printing process.

As previously stated, the keyboard, processor and monitor may be used to edit high resolution text, which may be displayed by conventional means separate from the generation of colour graphics. However, the full potential of the system is realized by displaying both the high resolution text with the colour graphics together, so that the operating artist can actually see the finished result and build up the design with both the colour graphics and the high resolution text etc. shown on the monitor.

The monitor does not have the same spatial resolution as the control store and therefore cannot display high resolution control data directly, however, systems for converting the one-bit data to intensity related data are known.

Alternatively, the system may be provided with an eight-bit stencil store 29, having the same resolution as the pixel framestores 11 and 23, and, as data is supplied to the control store 19, a low resolution version of said data (possibly generated using the technique disclosed in the aforesaid co-pending application) is supplied to the stencil store 29. The stencil store then controls switching between framestore 11 and framestore 23 so that the text in the control store is displayed in colors determined by the image stored in framestore 23 against a background determined by the image stored in framestore 11.

In the embodiment disclosed, both dot generators 18 and 25 produce similar shaped clusters. However, they could produce different shapes; one may, for example, produce continuous lines, the width of which are controlled in response to the intensity related data.

Having thus described the present invention by relevance to a preferred embodiment it is to be understood that modifications and variations may be made without departure from the spirit and scope of the invention as set forth in the appended claims and equivalents thereof.

What we claim is:

1. A high resolution print dot generating apparatus comprising:
a pixel source of intensity related pixel data representing a first image;

converting means for converting said pixel data to first print data defining an array of print dot clusters representing at least one color separation of said image and having a first resolution limited by the spacing of the clusters;

a print data source of second print data representing a second image different to that of said first print data;

a dot source of third print data, independent of said first and second print data, defining a control image representing at least one character or other predefined shape and having a second resolution which is higher than said first resolution and is limited by the spacing of print dots forming said print dot clusters; and selecting means responsive to said third print dot data for selecting either said first print data or said second print data to output print dot data for use in printing such that the output print dot data represents at least one color separation of said first image at said first resolution combined with a portion of said second image defining at least one character or other predefined shape at said second resolution.

2. An apparatus according to claim 1, wherein said third print dot data are run length encoded.

3. An apparatus according to claim 1, wherein said third print dot data are defined on a print dot by print dot basis.

4. An apparatus according to claim 1, wherein said pixel source comprises a first framestore means arranged to store intensity related data representing a whole image.

5. An apparatus according to claim 1, wherein said second print data represent a single color.

6. An apparatus according to claim 1, wherein said print data source comprises a second framestore means arranged to store intensity related pixel data representing a whole image, said converting means being further arranged to convert said pixel data from said second framestore to said second print data.

7. An apparatus according to claim 4, wherein said first framestore means is arranged to store three color intensity components for each pixel location.

8. An apparatus according to claim 6, wherein said second framestore means is arranged to store three color intensity components for each pixel location.

9. An apparatus according to claim 7, wherein said components are each defined by eight bits and represent either red, green or blue color intensity components.

10. An apparatus according to claim 8, wherein said components are each defined by eight bits and represent either red, green or blue color intensity components.

11. An apparatus according to claim 9, wherein said converting means comprises a matrix for converting said red, green and blue components to subtractive components of cyan, magenta, yellow and black.

12. An apparatus according to claim 10, wherein said converting means comprises a matrix for converting said red, green and blue components to subtractive components of cyan, magenta, yellow and black.

13. An apparatus according to claim 1, wherein said dot source of third print dot data is a one-bit storage device.

14. An apparatus according to claim 11, wherein said one bit storage device has a storage location for each print-dot location in the image frame.

15. An apparatus according to claim 12, wherein said one bit storage device has a storage location for each print-dot location in the image frame.

16. An apparatus according to claim 1, comprising a source of constant apply-dot signals, switching means for switching between said source of constant apply-dot signals and said output, and a detector for detecting changes in said high resolution control data, wherein said switching means is switched to said constant apply-dot signals for at least one high resolution print dot position in response to a signal from said detector indicating a change in said control data.

17. A method of generating high resolution print dot data, the method comprising:

converting intensity related pixel data representing a first image to first print data defining an array of print dot clusters representing at least one color separation of said image and having a first resolution limited by the spacing of the clusters;

providing second print data representing a second image different to that of said first print data;

defining independently of said first and second print data a control image as third print data representing at least one character or other predefined shape and having a second resolution which is higher than said first resolution and is limited by the spacing of print dots forming said print dot clusters;

selecting in response to said third print dot data either said first print data or said second print data for output for use in printing such that the output print dot data represents at least one color separation of said first image at said first resolution combined with a portion of said second image defining at least one character or other predefined shape at said second resolution.

18. A method according to claim 17, wherein said intensity related pixel data are stored as values representing red, green and blue components which are converted to subtractive intensity related signals.

19. A method according to claim 18, wherein a pattern of print dots is generated for each of said subtractive color separations.

20. A method according to claim 17, wherein said dot clusters produced for each separation are mutually offset.

21. A method according to claim 18, wherein data from four intensity related pixels are used to generate each of said dot clusters.

22. A method according to claim 11, wherein said control image data are stored in a run-length encoded form.

23. A method according to claim 12, wherein said control image data are stored in a run-length encoded form.

24. A method according to claim 11, wherein changes in said control data are detected and on detecting a change in said control data a constant apply dot or apply no dot signal is supplied to said output.

25. A method according to claim 12, wherein changes in said control data are detected and on detecting a change in said control data a constant apply dot or apply no dot signal is supplied to said output.

26. A high resolution print dot generating apparatus comprising:

(a) a first source of print dot signals, representing respectively different color separations of a first set of separations, the print dot signals representing each separation comprising an array of print dot clusters defining the intensity of the respective separation, (b) a second source of print dot signals representing respectively different color separations of a second set of separations, the print dot signals representing each separation comprising an array of print dot clusters defining the intensity of the respective separation, (c) a source of control signals representing a control image comprising an array of print dots defining a selected shape, said shape-defining print dots having the same resolution as the individual print dots of at least one of said first and said second sources of print dot signals, (d) selecting means for selectively outputting the print dot signals from said second source of print dot signals in response to the print dots of said control signal defining said shape, and for selectively outputting the print dot signals from said first source of print dot signals in the absence of print dots in said control signal, whereby the output signals represent a character of a shape defined by said control signals and having a color defined by said second set of separations, set against a background determined by first set of color separations.

* * * * *